(12) United States Patent
Lemonnier et al.

(10) Patent No.: US 8,943,494 B2
(45) Date of Patent: Jan. 27, 2015

(54) METHOD FOR INSTALLING AND MANAGING NFC APPLICATIONS WITH PICTURES

(75) Inventors: Vincent Lemonnier, Meudon (FR); Alexandre Corda, Meudon (FR); Jonathan Azoulai, Meudon (FR)

(73) Assignee: Gemalto SA, Meudon Cedex (FR)

( * ) Notice: Subject to any disclaimer, the term of this patent is extended or adjusted under 35 U.S.C. 154(b) by 1183 days.

(21) Appl. No.: 12/863,085

(22) PCT Filed: Jan. 12, 2009

(86) PCT No.: PCT/IB2009/050107
§ 371 (c)(1), (2), (4) Date: Dec. 9, 2010

(87) PCT Pub. No.: WO2009/090591
PCT Pub. Date: Jul. 23, 2009

(65) Prior Publication Data
US 2011/0072425 A1    Mar. 24, 2011

(30) Foreign Application Priority Data
Jan. 16, 2008   (EP) .................................. 08290034

(51) Int. Cl.
  *G06F 9/445* (2006.01)
  *H04L 29/08* (2006.01)
  (Continued)

(52) U.S. Cl.
  CPC .............. *H04L 67/06* (2013.01); *H04L 67/34* (2013.01); *G06Q 20/32* (2013.01); *H04W 8/245* (2013.01);
  (Continued)

(58) Field of Classification Search
  USPC ..................... 717/174, 168; 705/51
  See application file for complete search history.

(56) References Cited

U.S. PATENT DOCUMENTS

| 6,983,371 B1* | 1/2006 | Hurtado et al. | 713/189 |
| 2008/0128505 A1* | 6/2008 | Challa et al. | 235/462.13 |
| 2008/0263511 A1* | 10/2008 | Shapiro | 717/104 |

FOREIGN PATENT DOCUMENTS

| EP | 1 517 277 A2 | 3/2005 |
| WO | 2007031746 A2 | 3/2007 |
| WO | 2007068993 A1 | 6/2007 |

OTHER PUBLICATIONS

International Search Report from PCT/IB2009/050107 dated Jun. 5, 2009 (3 pages).

(Continued)

*Primary Examiner* — Tsan-Yu J Huang
(74) *Attorney, Agent, or Firm* — Osha Liang LLP

(57) ABSTRACT

A method for installing a NFC application (APP) that includes a picture (PIC) in a mobile communication device (3) comprises: at a Service Provider (1) transmitting the NFC application (APP) together with the picture (PIC) to a Trusted Service Manager (2); at the Trusted Service Manager (2), separating the picture (PIC) from the NFC application (APP) and storing it and transmitting the NFC application (APP) together with a reference (REF) to a storage location of the picture (PIC) to the mobile communication device (3); at the mobile communication device (3), installing the NFC application (APP) together with the reference (REF) and retrieving the picture (PIC) by sending the reference (REF) to the Trusted Service Manager (2) requesting download of the picture (PIC); at the Trusted Service Manager (2), fetching the picture (PIC) from the storage location indicated by the reference (REF) and downloading it to the mobile communication device (3).

10 Claims, 1 Drawing Sheet

(51) Int. Cl.
  *G06Q 20/32* (2012.01)
  *H04W 4/00* (2009.01)
  *G06Q 20/34* (2012.01)
  *H04W 8/24* (2009.01)
(52) U.S. Cl.
  CPC ............... *H04L 67/04* (2013.01); *G06Q 20/322* (2013.01); *H04W 4/008* (2013.01); *H04W 4/001* (2013.01); *G06Q 20/3552* (2013.01); *G06Q 20/3278* (2013.01)
  USPC .............................. 717/174; 717/168; 705/51

(56) References Cited

OTHER PUBLICATIONS

"Mobile NFC Technical Guidelines, Version 2.0"; GSM Association; Nov. 2007 (95 pages).

* cited by examiner

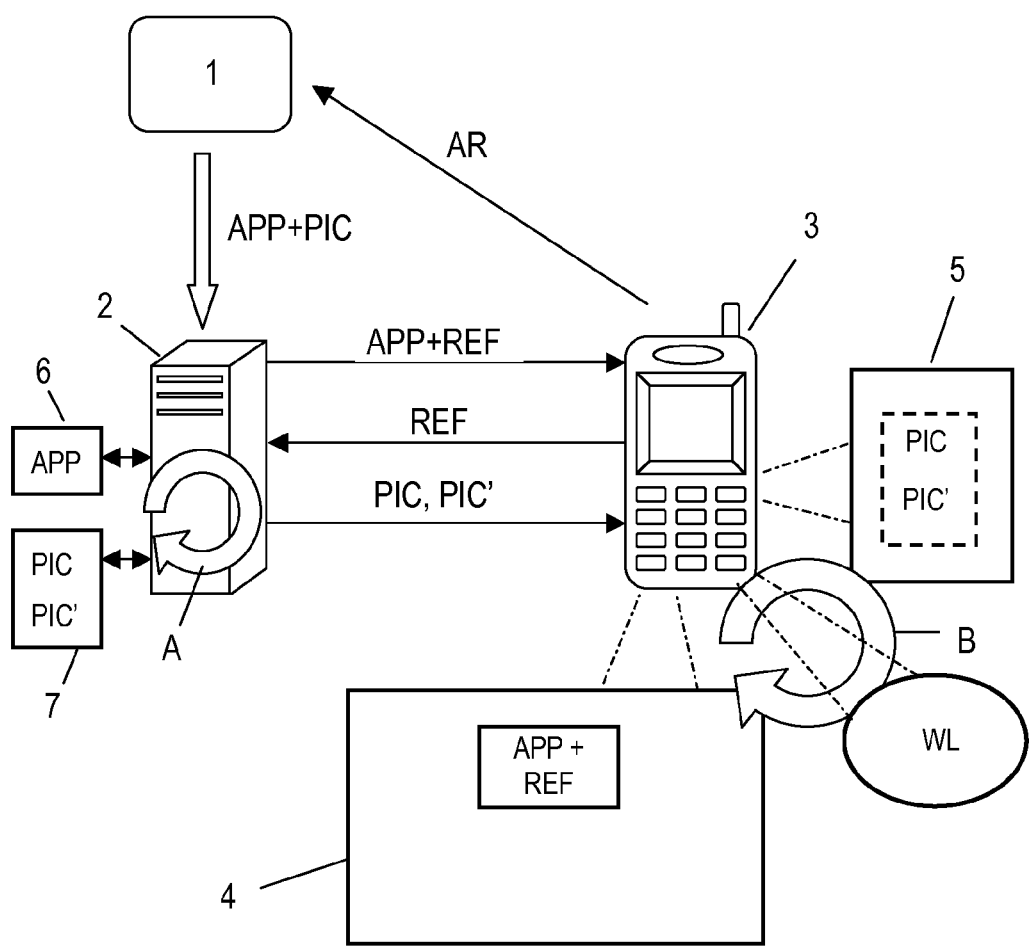

METHOD FOR INSTALLING AND MANAGING NFC APPLICATIONS WITH PICTURES

FIELD OF THE INVENTION

The invention relates to a method for installing a NFC application that includes a picture in a mobile communication device.

The invention further relates to a Trusted Service Manager being adapted to receive from a Service Provider a NFC application together with at least one picture.

The invention relates to a method for managing in a mobile communication device a NFC application that includes at least one picture.

The invention further relates to a computer program product directly loadable into the memory of a programmable mobile communication device, comprising software code portions for executing the steps of a method according to the above paragraph when said product is run on the device.

The invention further relates to a programmable mobile communication device being adapted to process the computer program product mentioned in the above paragraph.

BACKGROUND OF THE INVENTION

There are mobile communication devices known which contain memory devices having unique memory device identifications, e.g. the MIFARE® classic family, developed by NXP Semiconductors, a contactless smart card IC operating in the 13.56 MHz frequency range with read/write capability. Recently, secure elements have been developed which are memory devices providing enhanced security features, particularly for the use in mobile phones and other mobile communication devices with Near Field Communication (NFC) capabilities. Said secure elements are also known as "Smard Cards". For a better understanding a SmartMX device which is a leading representative of the secure elements will now be explained. SmartMX (Memory eXtension) is a family of smart cards that have been designed by NXP Semiconductors for high-security smart card applications requiring highly reliable solutions, with or without multiple interface options. Key applications are e-government, banking/finance, mobile communications and advanced public transportation.

SmartMX architecture combines coprocessors for RSA, ECC, DES and AES and enables implementation of operating systems including Java Open Platform and MULTOS. The ability of SmartMX cards to run the MIFARE protocol concurrently with other contactless transmission protocols implemented by the User Operating System enables the combination of new services and existing applications based on MIFARE (e.g. ticketing) on a single Dual Interface controller based smart card. SmartMX cards are able to emulate MIFARE Classic devices and thereby makes this interface compatible with any installed MIFARE Classic infrastructure. The contactless interface can be used to communicate via any protocol, particularly the MIFARE protocol and self defined contactless transmission protocols. SmartMX enables the easy implementation of state-of-the-art operating systems and open platform solutions including JCOP (the Java Card Operating System) and offers an optimized feature set together with the highest levels of security. SmartMX incorporates a range of security features to counter measure side channel attacks like DPA, SPA etc. A true anticollision method (acc. ISO/IEC 14443-3), enables multiple cards to be handled simultaneously.

In February 2007 the GSM Assocation (GSMA) published a white paper outlining operator community guidance for the eco-system parties involved in the development of Mobile NFC (Near Field Communication) services. Mobile NFC is defined as the combination of contactless services with mobile telephony, based on NFC technology. The mobile phone with a hardware-based secure identity token (the UICC) can provide the ideal environment for NFC applications. The UICC can replace the physical card thus optimising costs for the Service Provider, and offering users a more convenient service. Various different entities are involved in the Mobile NFC ecosystem. These are defined below:

- Customer—uses the mobile device for mobile communications and Mobile NFC services. The customer subscribes to an MNO and uses Mobile NFC services.
- Mobile Network Operator (MNO)—provides the full range mobile services to the Customer, particularly provides UICC and NFC terminals plus Over The Air (OTA) transport services.
- Service Provider (SP)—provides contactless services to the Customer (SPs are e.g. banks, public transport companies, loyalty programs owners etc.).
- Retailer/Merchant—service dependent, e.g. operates a NFC capable Point of Sales (POS) terminal.
- Trusted Service Manager (TSM)—securely distributes and manages the Service Providers' services to the MNO customer base.
- Handset, NFC Chipset and UICC Manufacturer—produce Mobile NFC/Communication devices and the associated UICC hardware.
- Reader Manufacturer—produces NFC reader devices.
- Application developer—designs and develops the Mobile NFC applications.
- Standardisation Bodies and Industry Fora—develop a global standard for NFC, enabling interoperability, backward compatibility and future development of NFC applications and services.

One of the key findings in said white paper is that Mobile NFC will be successful provided that the Mobile NFC eco-system is steady, providing value for all entities within it; and is efficient, by introducing a new role of the Trusted Service Manager.

The role of the Trusted Service Manager (TSM) is to:
- Provide the single point of contact for the Service Providers to access their customer base through the MNOs.
- Manage the secure download and life-cycle management of the Mobile NFC application on behalf of the Service Providers.

The TSM does not participate in the transaction stage of the service, thus ensuring that the Service Providers' existing business models are not disrupted. Depending on the national market needs and situations, the TSM can be managed by one MNO, a consortium of MNOs, or by independent Trusted Third Parties. The number of operating TSMs in one market will depend on the national market needs and circumstances.

A characteristic feature of secure elements such as SmartMX cards is that they allow trusted applications (also known as Wallets or Trusted MIDlets) that are installed in a mobile communication device communicating with said secure element to securely manage NFC applications (coupons, tickets, . . . ) that are installed in the secure element of the mobile communication device with NFC capabilities. The Wallets can be said to constitute a graphical user interface for the NFC application. In order to accomplish this task the Wallets are able to retrieve the list of NFC applications installed in the secure element as well as to retrieve some information about those NFC applications. When a Service Provider wants to provide a NFC application with an included picture (e.g. logo, photo, electronic signature, and so on . . . ) to the mobile communication, which picture should be displayed by a Wallet or trusted application, the sizes of those pictures may cause limitations. A straight forward procedure to install such NFC application with pictures is to send the picture together with the NFC application. By doing it this way, the picture will be stored together with the NFC application in the secure element which is a memory that is very limited in size. This means that the picture will use memory space that is normally intended to be used only for the efficient data of the NFC application. One approach to circumvent this problem of limited memory space in the secure element is to send the pictures together with the NFC application, but to store the pictures not in the secure element, but in another memory of the mobile communication device. With this solution NFC application memory space in the secure element will not be wasted. Nevertheless, after a while, a lot of memory space could be consumed by pictures.

OBJECT AND SUMMARY OF THE INVENTION

It is an object of the invention to provide a method for installing a NFC application that includes at least one picture in a mobile communication device, a Trusted Service Manager, a method for managing in a mobile communication device a NFC application that includes at least one picture, and a programmable mobile communication device, in which the disadvantages defined above are avoided.

In order to achieve the object defined above, with a method for installing a NFC application that includes at least one picture in a mobile communication device according to the invention characteristic features are provided so that such a method can be characterized in the way defined below, that is:

A method for installing a NFC application that includes at least one picture in a mobile communication device being equipped with a secure element, such as a SmartMX device, wherein a trusted application, also known as wallet, which manages NFC applications is located in the mobile communication device, wherein the method comprises:

at a Service Provider which provides the NFC application, transmitting the NFC application together with the picture to a Trusted Service Manager which controls installation of NFC applications in the mobile communication device;

at the Trusted Service Manager, separating the picture from the NFC application, storing the picture and transmitting the NFC application together with a reference to a storage location of the picture to the mobile communication device;

at the mobile communication device, installing the NFC application together with the reference in the secure element and retrieving the picture by sending the reference or information that corresponds to said reference to the Trusted Service Manager requesting to download the picture from the storage location to which the reference points;

at the Trusted Service Manager, processing the request for download of picture by fetching the picture from the storage location indicated by the reference and downloading it to the mobile communication device;

at the mobile communication device, when receiving the picture processing it by the trusted application.

In order to achieve the object defined above, with a Trusted Service Manager according to the invention characteristic features are provided so that such a Trusted Service Manager can be characterized in the way defined below, that is:

A Trusted Service Manager being adapted to receive from a Service Provider a NFC application together with at least one picture, to separate the picture from the NFC application, to store the picture, to transmit the NFC application together with a reference to a storage location of the picture to the mobile communication device, and to process a request of the mobile communication device for download of the picture indicated by the reference by fetching the picture from the storage location indicated by the reference and downloading it to the mobile communication device.

In order to achieve the object defined above, with a method for managing in a mobile communication device a NFC application that includes at least one picture according to the invention characteristic features are provided so that such a method can be characterized in the way defined below, that is:

A method for managing in a mobile communication device a NFC application that includes at least one picture, comprising:

receiving from a Trusted Service Manager the NFC application together with a reference to a storage location of the picture or a re-encoded version of the picture;

installing the NFC application together with the reference locally in the mobile communication device, particularly in a secure element, such as a SmartMX device, of the mobile communication device, and retrieving the picture or re-encoded picture by sending the reference or information that corresponds to said reference to the Trusted Service Manager requesting download of the picture or re-encoded picture from the storage location to which the reference points;

when receiving the picture or re-encoded picture processing it.

In order to achieve the object defined above, with a computer program product according to the invention characteristic features are provided so that a computer program product according to the invention is directly loadable into the memory of a programmable mobile communication device and comprising software code portions for performing the steps of a method according to the invention when said product is run on the device.

In order to achieve the object defined above, a programmable mobile communication device according to the invention comprises an arithmetic-logic unit and a memory and processes the computer program product according to the above paragraph.

The characteristic features according to the invention provide the advantage that Service Providers are enabled to install their NFC applications with a picture in a mobile communication device, particularly a NFC mobile phone, by bypassing memory constraints. Another advantage of the present invention is that it allows a wallet (or other trusted application managing NFC applications) to display a picture (e.g. logo, photo, electronic signature, and so on . . . ) for each NFC application. Further, this invention describes a way to avoid sending to the mobile communication device the picture when issuing the NFC application, avoiding also the permanent storage of such picture in the mobile communication device. Yet another advantage of the present invention is that it provides a picture management system to manage pictures (resize, change format . . . ) depending on the hardware and software requirements of the mobile communication devices (for example, to avoid sending large pictures to a NFC mobile phone with a small screen).

The aspects defined above and further aspects of the invention are apparent from the exemplary embodiment to be described hereinafter and are explained with reference to this exemplary embodiment.

BRIEF DESCRIPTION OF THE DRAWINGS

The invention will be described in more detail hereinafter with reference to an exemplary embodiment. However, the invention is not limited to this exemplary embodiment.

FIG. 1 shows a schematic diagram of a telecommunication system in the context of which the invention is embedded and the steps of the method according to the present invention.

DESCRIPTION OF EMBODIMENTS

FIG. 1 shows a schematic diagram of a telecommunication system, e.g. a Mobile NFC ecosystem as disclosed in the above referenced GSMA white book. The system comprises a Service Provider 1, a Trusted Service Manager 2 and a mobile communication device 3. It should be observed that the numbers Service Providers 1, a Trusted Service Managers 2 and a mobile communication devices 3 is in now way limited. The Service Provider 1 communicates with the mobile communication device 3 via the Over-the-Air (OTA) services provided by a Mobile Network Operator, particularly via Short Message Service (SMS) services, and/or via a computer network and wireless services, e.g. NFC services. NFC terminals for carrying out NFC services may be provided by the Mobile Network Operator. Similarly, the Trusted Service Manager 2 communicates with the mobile communication device 3 via an Over-The-Air service of a Mobile Network Operator, e.g. Short Message Service. The Service Provider 1 communicates with the Trusted Service Manager 2 via a computer network, such as the Internet, wherein the preferred data transmission protocol is HTTPS.

The mobile communication device 3 may e.g. be configured as a NFC mobile phone. It comprises a secure element 4 which is a memory device with enhanced security features that has its own computational power. The secure element 4 is advantageously configured as a SmartMX device that may comprise multiple interface options. SmartMX devices also comprise encryption coprocessors and enable implementation of operating systems including Java Operating Systems. The secure element 4 is adapted to contain NFC applications (coupons, tickets, etc.) that are provided by the Service Provider 1. The mobile communication device 3 contains a trusted application WL, also known as wallet, which manages NFC applications installed in the secure element 4. Particularly, the trusted application WL is able to retrieve a list of NFC applications installed in the secure element 4 as well as to retrieve some information about those NFC applications. Frequently, the trusted application WL is operated as a graphical user interface for said NFC application.

An end-user, i.e. the owner of the mobile communication device 3 requests (AR) from the Service Provider 1 a NFC application APP to be installed in his mobile communication device 3 having NFC capabilities. The Service Provider 1 processes this request AR by sending to the Trusted Service Manager 2 the requested NFC application APP which has an associated picture PIC. The term "picture" as used here is not limited and comprises e.g. a logo, a photo, an electronic signature, and so on. The Trusted Service Manager 2 separates the picture PIC from the NFC application APP and stores both the NFC application APP and the picture PIC. In a preferred embodiment of the invention prior to storing the picture PIC the Trusted Service Manager 2 re-encodes the picture PIC associated with the NFC application APP to fit the mobile communication device's 3 hardware and software specifications (e.g. screen size, image format . . . ) and stores the re-encoded picture PIC' together with or instead of the original picture PIC. All the aforementioned steps are represented in the drawing by rotating arrow A. As shown in FIG. 1 different storage devices 6, 7, are used for storing the NFC application APP and the picture PIC and/or the re-encoded picture PIC', respectively. However, one common storage device could also be used. It should further be noticed that the picture memory device 7 could be configured as a dedicated server or the like.

Next, the Trusted Service Manager 2 transmits the NFC application APP together with a reference REF to the storage location of the picture PIC or the re-encoded picture PIC' to the mobile communication device 3. It has to be emphasized that the picture PIC or the re-encoded picture PIC' itself is not sent to the mobile communication device 3, but for the moment has been replaced by the reference REF corresponding to the storage location of it on the picture memory device 7 of the Trusted Service Manager 2. The reference REF can be configured in form of an URL (Uniform Resource Locator).

When the NFC application APP is received at the mobile communication device 3 it is installed in the secure element 4 together with the reference REF. Once the NFC application APP has been installed, the user of the mobile communication device 3 can start the trusted application WL located in his mobile communication device 3 to get a list of all NFC applications that are installed in the secure element 4 (which in the present example only contains the NFC application APP).

The trusted application WL is also able to retrieve information related to the NFC application APP (such as application title, application validity . . . ) as well as the reference REF to the application picture PIC or the re-encoded picture PIC'. When the trusted application WL realizes that the NFC application APP comprises a reference REF to a picture PIC or re-encoded picture PIC' it sends this reference REF (or information corresponding to said reference REF) to the Trusted Service Manager 2 requesting download of the picture PIC or the re-encoded picture PIC' from the Trusted Service Manager 2. The Trusted Service Manager 2 answers this download request by sending the picture PIC or the re-encoded picture PIC' to the trusted application WL. Once, the trusted application WL has received the picture PIC or the re-encoded picture PIC' it will display it on the screen of the mobile communication device 3. Further, the trusted application WL has options to store this downloaded picture PIC or re-encoded picture PIC' so that it has never to be downloaded again or, alternatively, to download the picture PIC or the re-encoded picture PIC' every time it is needed. A third option is that the trusted application WL only stores the most frequently used pictures locally and downloads the other pictures each time they are needed. If the trusted application WL decides to store a picture PIC or a re-encoded picture PIC' locally in the mobile communication device 3 then it can choose between free memory space in the internal memory of the mobile communication device 3 or in a separate memory device 5, e.g. an memory card. A reasonable strategy for storing pictures is to store the small re-encoded pictures PIC' in the internal memory and to store larger pictures PIC in the separate memory device 5. Summarizing the above explanations the trusted application WL is responsible for the NFC application pictures life cycle in the mobile communication device 3. This responsibility is represented in FIG. 1 by a rotating arrow B.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for installing an NFC application comprising at least one picture within a mobile communication device equipped with a secure element, the method comprising:
   receiving, by a Service Provider which provides an NFC application, a request from the mobile communication device for the NFC application, and transmitting the NFC application together with the at least one picture to a Trusted Service Manager executing on a processor;
   separating, by the Trusted Service Manager, the at least one picture from the NFC application, re-encoding the at least one picture to obtain at least one re-encoded picture, storing the at least one re-encoded picture, and transmitting the NFC application together with a reference to a storage location of the at least one re-encoded picture to the mobile communication device;
   installing, by the mobile communication device, the NFC application together with the reference in the secure element, and retrieving the at least one re-encoded picture by sending one selected from a group consisting of the reference and information that corresponds to said reference to the Trusted Service Manager, and requesting to download the at least one re-encoded picture from the storage location to which the reference points;
   processing, by the Trusted Service Manager, the request for the downloading of the at least one re-encoded picture by obtaining the at least one re-encoded picture from the storage location indicated by the reference, and sending the at least one re-encoded picture to the mobile communication device; and
   receiving, by a trusted application located on the mobile communication device, the at least one re-encoded picture, processing the at least one re-encoded picture, and displaying the at least one re-encoded picture.

2. The method as claimed in claim 1, wherein the Trusted Service Manager re-encodes the at least one picture to fit the mobile communication device's hardware and software specifications.

3. The method as claimed in claim 1, wherein the mobile communication device stores the at least one re-encoded picture locally in one selected from a group consisting of an integrated memory in the mobile communication device and in another memory device operatively connected to the mobile communication device.

4. The method as claimed in claim 3, wherein the mobile communication device stores the at least one re-encoded picture of the NFC application when the at least one re-encoded picture is used multiple times.

5. A non-transitory computer readable medium storing instructions for installing an NFC application comprising at least one picture within a mobile communication device equipped with a secure element, wherein the instructions, when executed by a processor, cause the processor to perform the steps of:
   receiving from a Service Provider, in response to a request for the NFC application from the mobile communication device, the NFC application together with the at least one picture;
   separating the at least one picture from the NFC application;
   re-encoding the at least one picture to obtain at least one re-encoded picture;
   storing the at least one re-encoded picture;
   transmitting the NFC application together with a reference to a storage location of the at least one re-encoded picture to the mobile communication device;
   receiving, from the mobile communication device, one selected from a group consisting of the reference and information that corresponds to said reference; and
   processing a request of the mobile communication device for downloading the at least one re-encoded picture indicated by the reference by obtaining the at least one re-encoded picture from the storage location indicated by the reference and sending the at least one re-encoded picture to the mobile communication device, wherein the re-encoded picture is for displaying on the mobile communication device.

6. The non-transitory computer readable medium as claimed in claim 5, further configured:
   to re-encode the at least one picture received from the Service Provider to fit the mobile communication device's hardware and software specifications.

7. The method as claimed in claim 1, wherein the secure element includes a smart card.

8. The method as claimed in claim 1, wherein the secure element comprises a memory device having enhanced security features and computational power.

9. The method as claimed in claim 1, wherein the secure element is configured as a SmartMX device.

10. The method as claimed in claim 1, wherein the secure element is configured to comprise NFC applications.

* * * * *